(12) United States Patent
Maguire

(10) Patent No.: US 7,011,162 B2
(45) Date of Patent: Mar. 14, 2006

(54) HYDRAULICALLY ACTIVATED SWIVEL FOR RUNNING EXPANDABLE COMPONENTS WITH TAILPIPE

(75) Inventor: Patrick G. Maguire, Cypress, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 83 days.

(21) Appl. No.: 10/294,493

(22) Filed: Nov. 14, 2002

(65) Prior Publication Data

US 2004/0094309 A1    May 20, 2004

(51) Int. Cl.
    *E21B 17/05*    (2006.01)
    *E21B 17/02*    (2006.01)

(52) U.S. Cl. .................. 166/382; 166/242.6; 175/105; 464/50; 403/2; 285/3

(58) Field of Classification Search ............... 166/373, 166/374, 381, 382, 386, 242.1, 242.6; 175/101, 175/106; 464/20, 21, 32, 33; 403/2; 285/3
See application file for complete search history.

(56) References Cited

U.S. PATENT DOCUMENTS

| | | | | |
|---|---|---|---|---|
| 3,100,538 A | * | 8/1963 | Sanders ....................... | 166/237 |
| 3,771,603 A | * | 11/1973 | Crowe ......................... | 166/375 |
| 4,248,307 A | * | 2/1981 | Silberman et al. ........... | 166/374 |
| 4,562,889 A | * | 1/1986 | Braddick .................... | 166/381 |
| 4,603,743 A | * | 8/1986 | Lindsey, Jr. ................ | 166/382 |
| 4,658,895 A | * | 4/1987 | Brisco ........................ | 166/237 |
| 4,971,365 A | * | 11/1990 | Schultz ....................... | 285/2 |
| 4,995,464 A | * | 2/1991 | Watkins et al. ............. | 166/382 |
| 5,086,843 A | * | 2/1992 | Mims et al. ................ | 166/380 |
| 5,139,090 A | * | 8/1992 | Land .......................... | 166/369 |
| 5,181,570 A | * | 1/1993 | Allwin et al. ............... | 166/381 |
| 5,404,955 A | * | 4/1995 | Echols et al. ............... | 166/382 |
| 5,450,904 A | * | 9/1995 | Galle ......................... | 166/348 |
| 6,098,726 A | * | 8/2000 | Taylor et al. ............... | 175/320 |
| 6,131,953 A | * | 10/2000 | Connell et al. .............. | 285/3 |

(Continued)

FOREIGN PATENT DOCUMENTS

EP    0 624 709    11/1994

(Continued)

OTHER PUBLICATIONS

U.K. Search Report, Application No. GB 0326475.1, dated Feb. 18, 2004.

(Continued)

*Primary Examiner*—David Bagnell
*Assistant Examiner*—Jennifer H Gay
(74) *Attorney, Agent, or Firm*—Patterson & Sheridan, LLP

(57) ABSTRACT

An apparatus for use in a wellbore, the apparatus comprises a top body, a bottom body, and a sleeve mechanically connected to the top and bottom bodies. The sleeve movable between a first position to a second position, whereby in the first position, the top and bottom bodies rotate as one unit and in the second position, the top body rotates independent of the bottom body in a first direction and with the bottom body in a second direction. A method for completing a wellbore, wherein the method comprises running an assembly and a liner disposed on a drill string into the wellbore. The assembly includes an expander tool, a hydraulically actuated swivel, and a running tool mechanically connected to the liner. The method includes rotating the assembly and the liner as one rotationally locked unit. The method further includes activating the expander tool, expanding the liner into the existing casing, deactivating the expander, and then removing the drill string and running assembly from the wellbore.

36 Claims, 4 Drawing Sheets

U.S. PATENT DOCUMENTS 6,467,547 B1 * 10/2002 Maguire et al. ............ 166/386
2003/0127857 A1    7/2003 Boyd et al.
2004/0016544 A1 *  1/2004 Braddick .................... 166/277

FOREIGN PATENT DOCUMENTS

| GB | 2 339 442 | 1/2000 |
| NO | 1998 2344 | 7/1998 |
| WO | WO 98/29637 | 7/1998 |
| WO | WO 01/29373 | 4/2001 |

OTHER PUBLICATIONS

Official Action, Norwegian Patent Application No. 2003 5033, dated Jun. 9, 2004.

* cited by examiner

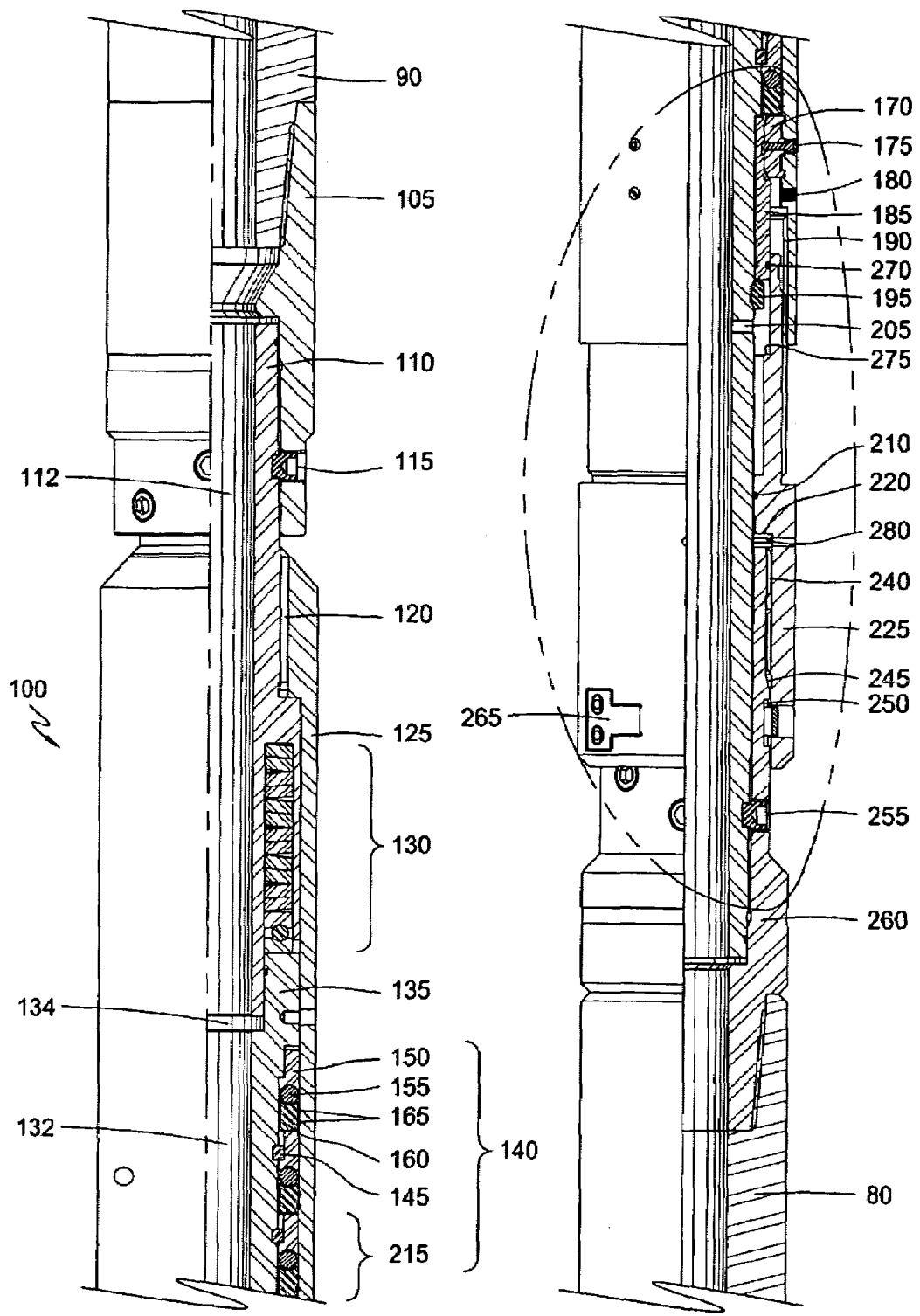

HYDRAULICALLY ACTIVATED SWIVEL FOR RUNNING EXPANDABLE COMPONENTS WITH TAILPIPE

BACKGROUND OF THE INVENTION

1. Field of the Invention

The present invention generally relates to an apparatus and methods for wellbore completion. More particularly, the invention relates to an apparatus and methods for allowing rotational movement of downhole tools. More particularly yet, the invention provides a hydraulically activated swivel.

2. Description of the Related Art

In the drilling of oil and gas wells, a wellbore is formed using a drill bit that is urged downwardly at a lower end of a drill string. After drilling a predetermined depth, the drill string and bit are removed, and the wellbore is lined with a string of steel pipe called casing. The casing provides support to the wellbore and facilitates the isolation of certain areas of the wellbore adjacent hydrocarbon bearing formations. The casing typically extends down the wellbore from the surface of the well to a designated depth. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth, and a second string of casing, or liner, is run into the well to a depth, whereby the upper portion of the second liner is overlapping the lower portion of the first string of casing. The second liner string is then fixed or hung in the wellbore, usually by some mechanical slip mechanism well-known in the art, and cemented. This process is typically repeated with additional casing strings until the well has been drilled to total depth.

A recent trend in well completion has been the advent of expandable tubular technology. It has been discovered that both slotted and solid tubulars can be expanded in situ so as to enlarge their inner diameter. This, in turn, enlarges the path through which both fluid and downhole tools may travel. Also, expansion technology enables a smaller tubular to be run into a larger tubular, and then expanded so that a portion of the smaller tubular is in contact with the larger tubular therearound. Tubulars are expanded by the use of a cone-shaped mandrel or by an expander tool with expandable, fluid actuated members disposed on a body and run into the wellbore on a tubular string. During expansion of a tubular, the tubular walls are expanded past their elastic limit. Examples of expandable tubular devices include slotted screen, joints, packers, and liners. The use of expandable tubulars as hangers and packers allows for greater fluid bypass when running in the hole, because the conventional slip mechanism and sealing mechanism are eliminated.

Generally, a liner is a string of casing that does not extend to the top of the wellbore, but instead is anchored or suspended from inside the bottom of the previous tubular string. Multiple uses for expandable liners are being discovered. For example, an intermediate liner can be hung off of a string of surface casing by expanding an upper portion of the intermediate liner into frictional contact with the lower portion of surface casing therearound. This allows for the hanging of a string of liner without the need for a separate slip assembly as described above. Additional applications for the expansion of downhole liners exist. These include the use of an expandable sand screen, employment of an expandable seat for seating a diverter tool, and the use of an expandable seat for setting a packer.

An expandable liner is typically run into the wellbore with a running assembly disposed at an end of a drill string. Typically, a conventional swivel is connected directly to the running tool and the expander tool to interact with the running assembly during the expansion operation. The running assembly includes an expander tool and a running tool. Generally, the expander tool is disposed at the bottom end of the drill string and the running tool is located below the expander tool. The conventional swivel attaches to the running assembly between the expander and the running tool, thereby allowing the expander tool to rotate while the running tool remains stationary. Additionally, the running tool is mechanically attached to the liner through a mechanical holding device.

After the expandable liner is lowered to a predetermined point near the end of an existing casing string, the upper portion of the liner is ready to be expanded into contact with the casing. To activate the expander tool, a hydraulic isolation device, like a ball, is circulated down into a seat in the expander tool. Thereafter, fluid is pumped from the surface of the wellbore down the drill string into the expander tool. When the fluid pressure builds up to a predetermined level, the expander tool is activated, thereby starting the expansion operation. During the expansion operation, the conventional swivel on the expandable liner allows the expander tool to rotate while the liner and the running tool remain stationary.

After the liner has been expanded against the casing, the running tool is disengaged from the liner, thereby transferring the weight of the liner string to the casing. Generally, the running tool includes a primary release system that is activated by pressuring up beyond the pressure reached for expansion. Thereafter, the fluid pressure is increased to a predetermined level to deactivate the running tool, thereby releasing the running tool from the liner. The running tool typically includes a secondary or back-up release for disengaging the liner from running tool if the primary release system fails to operate properly. In the event of a hydraulic failure, the back-up release permits the running tool to release the liner by a mechanical means. Typically, the back-up release involves left-hand rotation of the running tool by the drill string. As the drill string rotates to the left, the rotational force causes a mechanism within the running tool mechanically disconnect the running tool from the liner. After the running tool is disengaged from the liner, the running assembly is removed from the wellbore while the expanded liner remains downhole.

Several problems may occur using a conventional swivel and the running assembly to expand a liner downhole. One problem particularly associated with running the liner into the wellbore is the likelihood of encountering a downhole obstruction. In this event, the liner including the expander tool, conventional swivel, and running tool may need to be rotated in one direction, thereby allowing the liner to be "drilled" into the wellbore to overcome the obstruction. However, the conventional swivel does not permit the running assembly to act as one rotationally locked unit. Another problem is associated with the removal of the running tool from the liner after the expansion operation. When the running tool primary release mechanism fails to operate properly, it may be necessary to rotate the running tool to the left to mechanically disconnect the running tool from the liner. However, the conventional swivel does not have the functionality to release the running tool by rotating the swivel in a single direction.

A need therefore exists for an apparatus for expanding a liner without swivel that allows the running assembly to selectively act as one rotationally locked unit. There is a further need for an apparatus having the capability to support the entire weight of a string of liner while providing rotational freedom between an expanding tool and running tool. There is yet a further need for an apparatus to rotate the running tool to the left to mechanically disconnect the running tool from the liner in the event of a failure of primary release system due to a hydraulic malfunction.

SUMMARY OF THE INVENTION

The present invention generally relates to an apparatus for use in a wellbore. The apparatus comprises a top body, a bottom body, and a sleeve mechanically connected to the top and bottom bodies. The sleeve movable between a first position to a second position, whereby in the first position, the top and bottom bodies rotate as one unit and in the second position, the top body rotates independent of the bottom body in a first direction and with the bottom body in a second direction.

A hydraulically activated swivel for use in a well is also provided. The hydraulically activated swivel consists of an upper tubular and a lower tubular. The lower tubular is connected to a bottom connection by a lower spline assembly. The hydraulically activated swivel further includes a sleeve member connected to the upper tubular. The sleeve member movable from a first location to a second location. In the first location, the lower spline assembly is fully engaged, thereby permitting the upper and lower tubular to rotate as one unit. While in the second location, the lower spline assembly is disengaged, thereby allowing the upper tubular to rotate independent of the lower tubular in a first direction and with the lower tubular in a second direction.

A method is further provided for completing a wellbore. The method comprises running an assembly and a liner disposed on a drill string into the wellbore. The assembly includes an expander tool, a hydraulically actuated swivel, and a running tool mechanically connected to the liner. The method includes rotating the assembly and the liner as one rotationally locked unit and then placing the assembly and liner at a predetermined location near the end of an existing casing in the wellbore. The method also includes activating the hydraulically activated swivel by dropping a hydraulic isolation device from the surface of the wellbore. The method further includes activating the expander tool, expanding the liner into the existing casing, deactivating the expander, and then removing the drill string and running assembly from the wellbore.

BRIEF DESCRIPTION OF THE DRAWINGS

So that the manner in which the above recited features and advantages of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A and 2B are a cross-sectional view of the swivel after the sleeve is shifted axially downward to a second position.

DETAILED DESCRIPTION OF THE PREFERRED EMBODIMENT

This invention comprises of a hydraulically activated swivel 100 useful in a running assembly to expand an expandable liner downhole. Generally, the expandable liner is a tubular or tailpipe that is anchored or suspended at the bottom of the previous tubular string. Typically, the expandable liner is anchored or suspended by expanding an upper portion of the expandable liner into frictional contact with a lower portion of the tubular string. The expandable liner may be constructed and arranged to apply to various downhole applications.

In one application, the expandable liner may be constructed to include an integral packer arrangement to seal and hang the expandable liner from the previous tubular string. In the integral packing arrangement, the body of the expandable liner is modified by machining grooves into the surface. Thereafter, the grooves are typically filled with a pliable material, such as an elastomer, forming a packer, thereby increasing the sealing capability of the expandable liner to the previous tubular string. The integral packer arrangement also includes hardened inserts disposed between the grooves, such as carbide buttons, for gripping the surrounding tubular string upon contact. The gripping mechanism increases the capacity of the expandable liner to support its weight and to serve as a hanger. The expandable liner may also include a non-integral packer arrangement where the packer and the hanger are formed on different portions of expandable liner.

Additional applications for expandable liners include the use of an expandable sand screen, employment of an expandable seat for seating a diverter tool, and the use of an expandable seat for setting a packer. Therefore, the invention is not limited to expanding a tubular string, but is equally applicable to various downhole applications. Thus, throughout this disclosure, the term "liner" shall refer to various downhole applications.

Figure 1A:
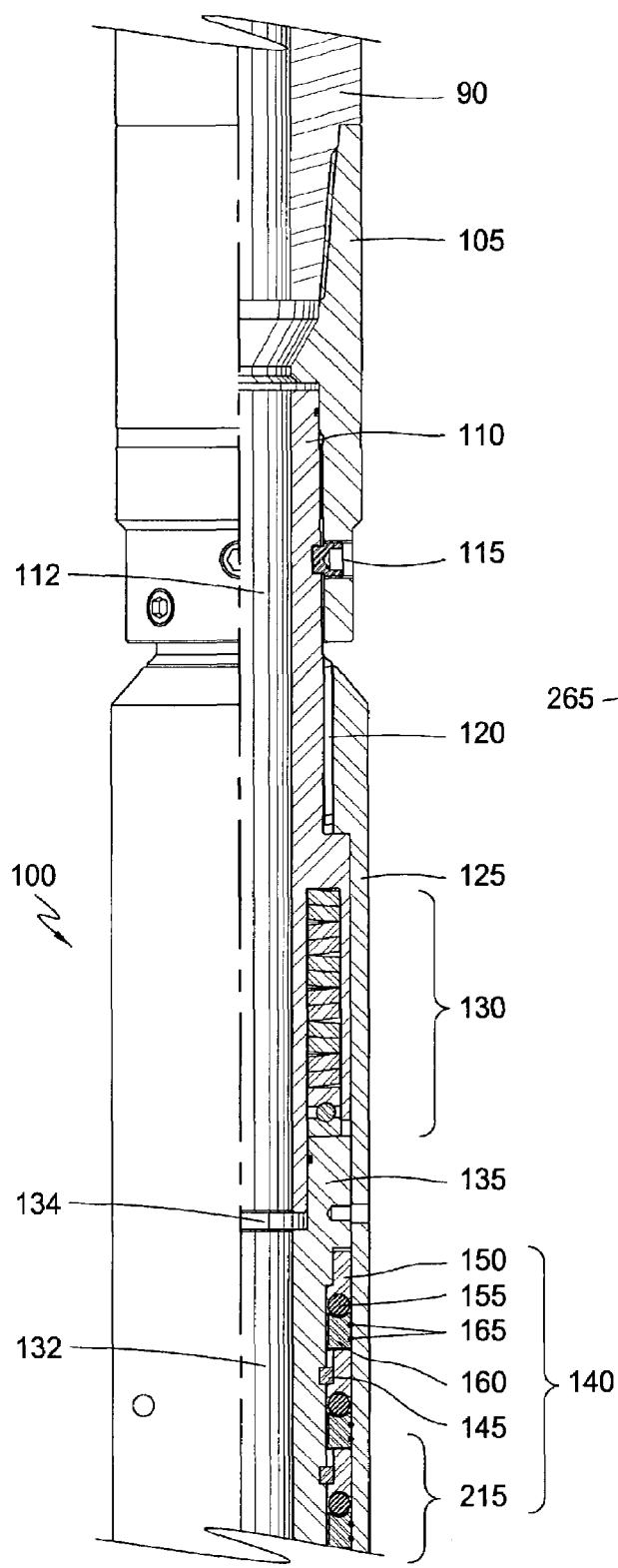
FIGS. 1A and 1B illustrates a cross-sectional view of one embodiment of a hydraulically activated swivel in accordance with the present invention.
Figure 1B:
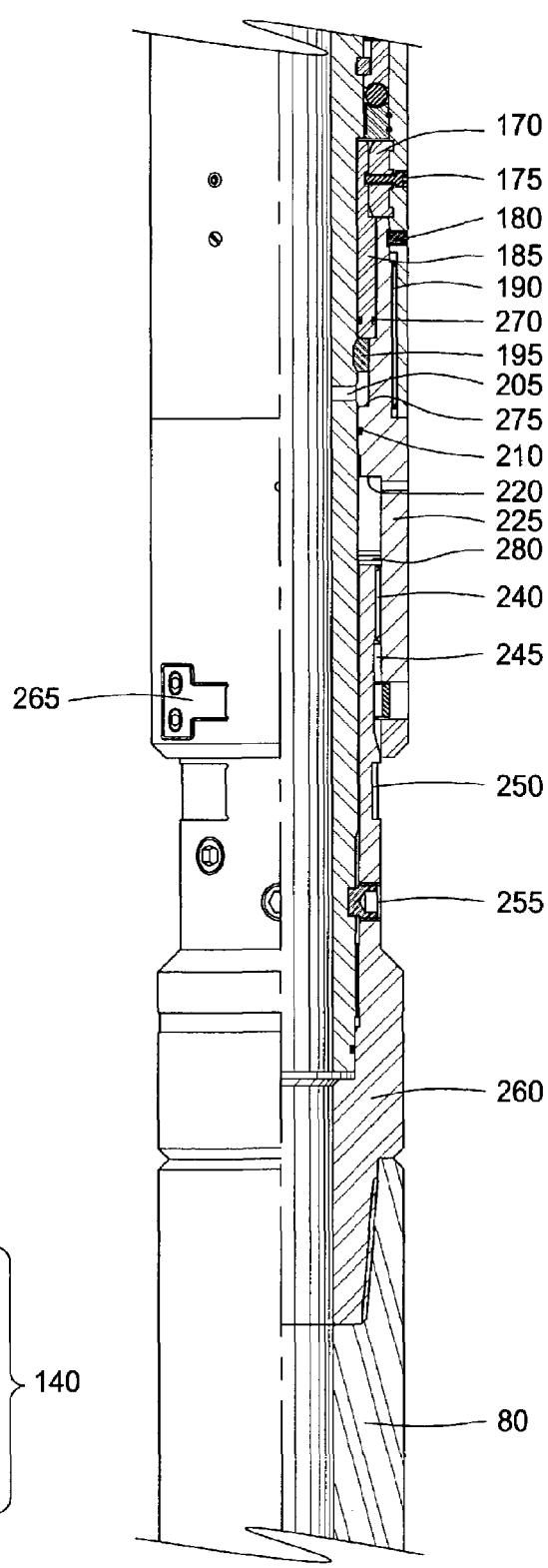

FIGS. 1A and 1B illustrate a cross-sectional view of one embodiment of the hydraulically activated swivel 100 in accordance with the present invention. The swivel 100 is generally disposed between an expander tool 90 and a running tool 80. The swivel 100 may be attached to the expander tool 90 using a top connection 105, while a bottom connection 260 may be used to connect running tool 80 to a lower end of the swivel 100. As illustrated, FIGS. 1A and 1B show the swivel 100 in the run-in position. In this position, the swivel 100 acts a one complete unit. In other words, the expander tool 90, the swivel 100 and the running tool 80 are rotationally locked with respect to one another, thereby allowing the rotation of the liner (not shown) by the drill string (not shown).

As shown in FIG. 1A, an upper mandrel 110 of the swivel 100 is connected to the top connection 105 using a thread, and is torsionally locked by at least one upper torque pin 115. The upper mandrel 110 is tubular body that contains an upper mandrel passageway 112 to direct fluid through the swivel 100. An upper spline assembly 120 connects the upper mandrel 110 to a housing 125. As used herein, a spline assembly means a mechanical torque connection between a first and second member. Typically, the first member includes a plurality of keys and the second member includes a plurality of keyways. When rotational torque is applied to the first member, the keys act on the keyways to transmit the torque to the second member. Additionally, the spline assembly may be disengaged by axial movement of one member relative to the other member, thereby permitting rotational freedom of each member. In this respect, a rotational force applied to the upper mandrel 110 will be transmitted through the engaged upper spline assembly 120, thereby causing the housing 125 to rotate.

In the embodiment shown on FIG. 1A, biasing members 130 are disposed at the lower end of the upper mandrel 110 to function as a shock absorber between the upper mandrel 110 and a lower mandrel 135. During operation of the swivel 100, the biasing members 130 permit the upper mandrel 110 to axially move a predetermined distance. The predetermined distance is illustrated on FIG. 1A as gap 134. In the preferred embodiment, the biasing members 130 are Bellville washers. However, other forms of biasing members 130 may be employed such as elasterometric material, springs or combinations thereof, so long as they permit substantial axial movement of the upper mandrel 110.

As illustrated in FIGS. 1A and 1B, the lower mandrel 135 is tubular body having a lower mandrel passageway 132 through the center of the mandrel 135. In this respect, the lower mandrel passageway 132 is fluidly connected to the upper mandrel passageway 112, thereby forming a fluid conduit through the length of this swivel 100. The lower mandrel 135 further includes an aperture 205 in a wall thereof in fluid communication with the lower mandrel passageway 132.

Load members 140 are disposed between the lower mandrel 135 and the housing 125. The load members 140 permit rotational movement of the housing 125 relative to the lower mandrel 135. Additionally, the load members 140 are capable of supporting the entire weight of the liner during the expansion operation by the expander tool 90. In the preferred embodiment, the load members 140 are a plurality of stacked thrust bearings 215. However, other forms of load members 140 may be employed, so long as they are capable of supporting the weight of the liner and allow rotational movement between the housing 125 and the lower mandrel 135. Each thrust bearing 145 comprises at least one wire carrier 165, a lower member 160, a ball 155, an upper member 150 and a shoulder member 145. The wire carrier 165 connects the housing 125 to the lower member 160. The lower member 160 is rotationally connected to the upper member 150 through the ball 155. The upper member 150 is connected to the lower mandrel 135 through the shoulder member 145. In this manner, the housing 125 is rotationally connected to the lower mandrel 135.

FIG. 1B shows a seal spacer 170 and a seal adapter 185 disposed at the lower end of the load members 140. The upper end of the seal adapter 185 is secured to the housing 125 by a locking pin 175 while the lower end is supported by a lockring 195 disposed around the lower mandrel 135. Further, a first seal member 270, such as an o-ring, is disposed at the lower end of the seal adapter 185, thereby allowing the seal adapter 185 to provide a sealing means between the lower mandrel 135 and the shiftable sleeve 225.

FIG. 1B further depicts a shiftable sleeve 225 in a first position. The sleeve 225 is movable between the first and a second position using hydraulic force. As illustrated, the sleeve 225 is partially disposed between the housing 125, the lower mandrel 135 and the bottom connection 260. At least one shearable connection 180 connects the sleeve 225 to the housing 125. In one embodiment, the shearable connection 180 is a shear pin. However, other forms of shearable connections may be employed, so long as they are capable of failing at a predetermined force, thereby allowing the sleeve 225 to move axially downward relative to the housing 125. In addition to the shearable connection 180, a middle spline assembly 190 also mechanically connects the sleeve 225 to the housing 125. In FIG. 1B, the middle spline assembly 190 is fully engaged, thereby capable of transmitting the full rotational force from the housing 125 to the sleeve 225. Further, a first sleeve shoulder 275 is formed on the inner portion of the sleeve 225. The first sleeve shoulder 275 is located near the aperture 205 in the lower mandrel 135 and later provides a hydraulic area to shift the sleeve 225 axially downward. A second sleeve shoulder 220 is also formed at the lower portion of the sleeve 225. The second sleeve shoulder 220 is used as a stop to limit the downward axial movement of the sleeve 225. A second sealing member 210, such as an o-ring, is disposed between the sleeve 225 and the lower mandrel 135. In this respect, both the first and second sealing members 210, 270 act as a fluid tight seal as the sleeve 225 is hydraulically urged downward.

As further shown on FIG. 1B, the lower end of the sleeve 225 is mechanically connected to the bottom connection 260 by a lower spline assembly 240. While the sleeve 225 is in the first position, the lower spline assembly 240 is capable of transmitting the rotational force from the sleeve 225 to the bottom connection 260. Below the lower spline assembly 240, a spline assembly relief 245 is formed to house a portion of the lower spline assembly 240 after the sleeve 225 has shifted to the second position. Also illustrated in FIG. 1B, a spring clip 265 is disposed on the outer portion of the sleeve 225. The spring clip 265 is used to mate with at least one relief groove 250 formed on an outer portion of the bottom connection 260 after the sleeve 225 is moved to the second position.

FIG. 1B further depicts the bottom connection 260 at the lower end of the swivel 100. The primary function of the bottom connection 260 is to act as a connection means between the swivel 100 and the running tool 80. The bottom connection 260 is secured to the lower mandrel 135 by a thread, and is torsionally locked by at least one lower torque pin 255. An upper portion of the bottom connection 260 is partially disposed between the sleeve 225 and the lower mandrel 135. As shown, a plurality of washers 280 are disposed on an upper end of the bottom connection 260 to reduce friction between the bottom connection 260 and the sleeve 225 after the sleeve 225 is moved to the second position.

FIGS. 1A and 1B illustrate the swivel 100 in the run-in position. In this position, the swivel 100 acts as one complete unit. In other words, the expander tool 90, the swivel 100 and the running tool 80 are rotationally locked with respect to one another, thereby allowing the rotation of the liner by the drill string. In this respect, a rotational force applied from the drill string to the expander tool 90 may be transmitted to the top connection 105. In turn, the top connection 105 transmits the rotational force through the upper torque pin 115 to the upper mandrel 110. The upper mandrel 110 transmits the rotational force through the upper spline assembly 120 to the housing 125. The housing 125 transmits the rotational force through the middle spline assembly 190 to the sleeve 225. The sleeve 225 transmits the rotational force through the lower spline assembly 240 to the bottom connection 260. The bottom connection 260 transmits the rotational force to the running tool 80 that is holding the liner. In this manner, the swivel 100 acts as a conduit for rotational force from the drill string to the liner.

FIGS. 2A and 2B are a cross-sectional view of the swivel 100 after the sleeve 225 is shifted axially to the second position. The axial movement of the sleeve 225 may be accomplished using a hydraulic isolation device (not shown), such as a ball or a dart, that is circulated down into a seat (not shown) below the running tool 80. Dropping the ball onto the seat allows fluid pressure to build up in the running tool 80 and the lower mandrel passageway 132 until the fluid level reaches aperture 205. At that point, pressurized fluid enters aperture 205 creating hydraulic force that acts against the first sleeve shoulder 275 of the sleeve 225. At a predetermined hydraulic force, the shearable connection 180 fails and the sleeve 225 is urged axially downward toward the second position. The sleeve 225 reaches the second position when the second sleeve shoulder 220 contacts the plurality of washers 280 disposed on the bottom connection 260. The movement of the sleeve 225 from the first to the second position also disengages the spline assembly 245, thereby removing the mechanical connection between the sleeve 225 and the bottom connection 260. Thereafter, the upper portion that includes connection 105, upper mandrel 110, housing 125, and sleeve 225, is rotationally separate from the lower portion that includes mandrel 135 and connection 260. In other words, the swivel 100 is capable of exclusively rotating the upper portion in a first direction while allowing the bottom portion to remain stationary.

On the other hand, the swivel 100 may rotate as a rotationally locked unit in a second direction. The movement of the sleeve 225 to the second position aligns the spring clip 265 on the sleeve 225 with the relief groove 250 formed on an outer portion of the bottom connection 260. The spring clip 265 is constructed and arranged to mate with the relief groove 250 when the upper portion of the swivel 100 rotates in the second direction. In this respect, the spring clip 265 acts upon the relief groove 250 causing the lower portion to rotate with the upper portion of the swivel 100. Conversely, the spring clip 265 will not mate with the relief groove 250 when the upper portion of the swivel 100 rotates in the first direction, thereby allowing the upper portion to rotate freely in respect to the lower portion. In this manner, the spring clip 265 and the relief groove 250 act as a clutch system allowing the rotation of the upper and lower portion as a rotationally locked unit in the second direction while permitting the upper portion to rotate free of the lower portion in the first direction.

Figure 3:
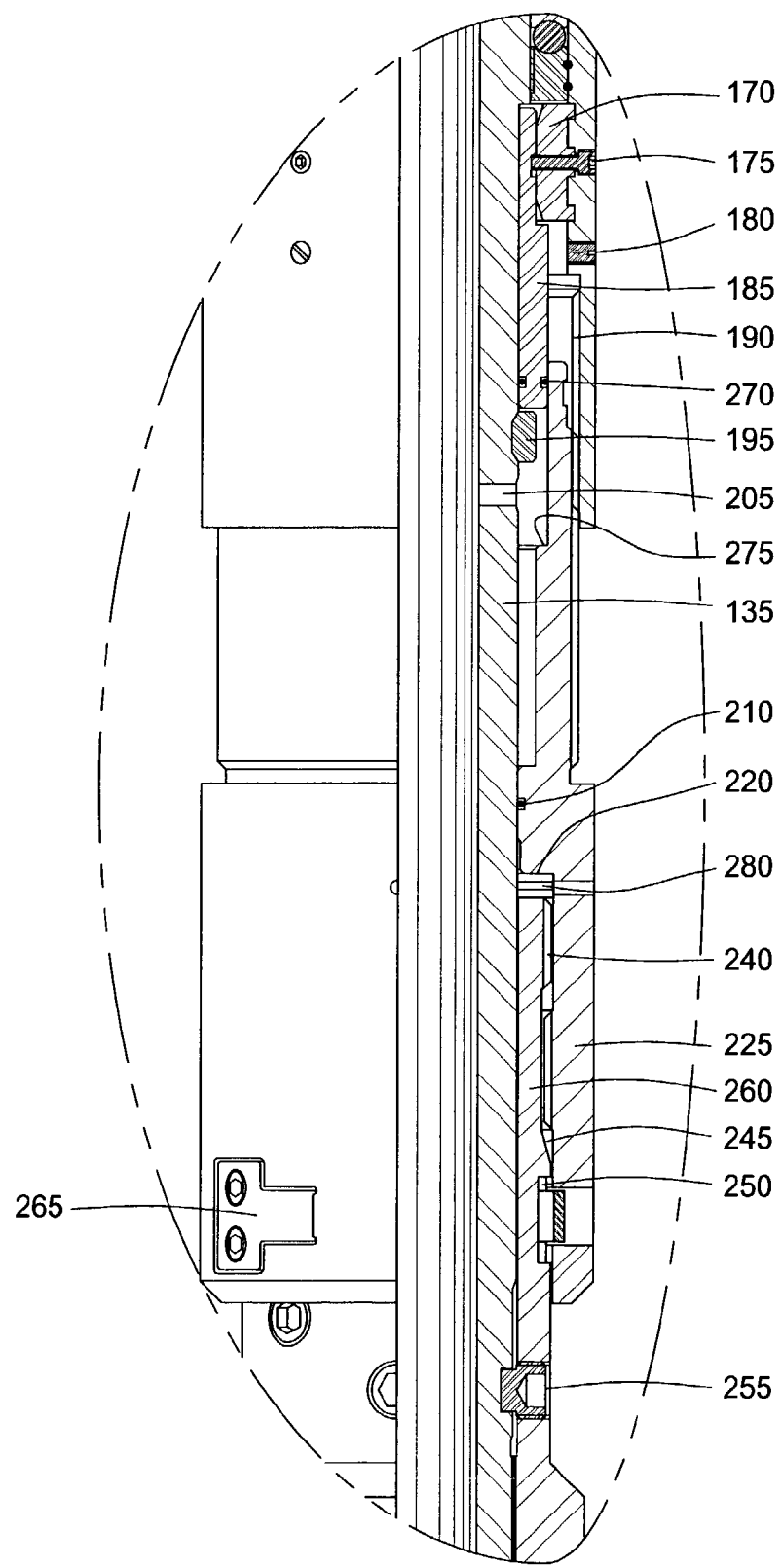
FIG. 3 is sectional view illustrating a circled portion of FIG. 2B.

FIG. 3 is an enlarged cross-sectional view of the swivel 100 as illustrated in FIG. 2B. In this view, the sleeve 225 is in the second position in contact with the plurality of washers 280. Further, the middle spline assembly 190 is partially engaged, thereby permitting transfer of rotational force between the housing 125 and the sleeve 225. However, the lower spline assembly 240 is completely disengaged. The portion of the spline assembly 240 attached to the bottom connection 260 did not move while the portion of spline assembly 240 attached to the sleeve 225 moved axially downward into the spline assembly relief 245. Therefore, the lower portion of the swivel 100 is no longer mechanically connected to the upper portion through the spline assembly 240. As further illustrated, the spring clip 265 is in line with the clip groove 250. While the swivel 100 in the preferred embodiment uses the sleeve 225 and spline assemblies 120, 190, 240 to connect the upper and lower mandrel 110, 135, it would be understood by one skilled in the art that a variety of different methods may be employed, which allow the swivel 100 to function in the manner described in previous paragraphs.

Figure 4A:
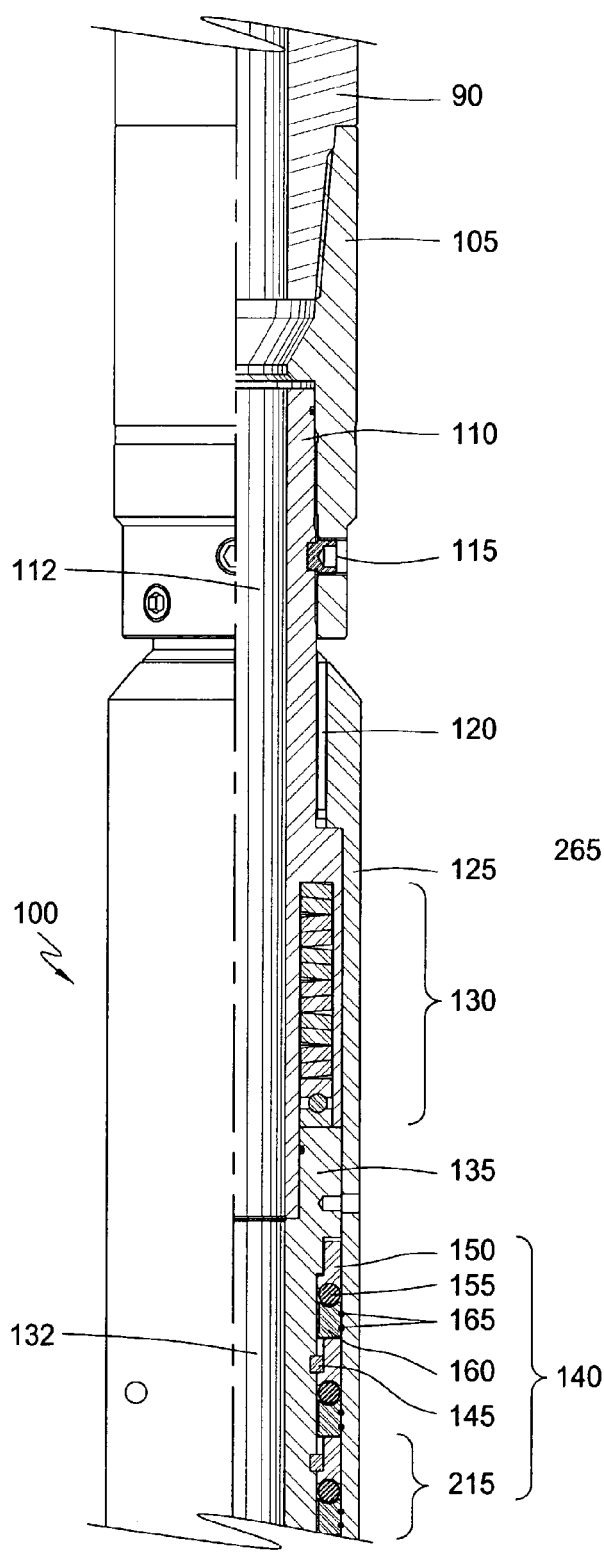
FIGS. 4A and 4B is a cross-sectional view illustrating the hydraulically activated swivel in compression.
Figure 4B:
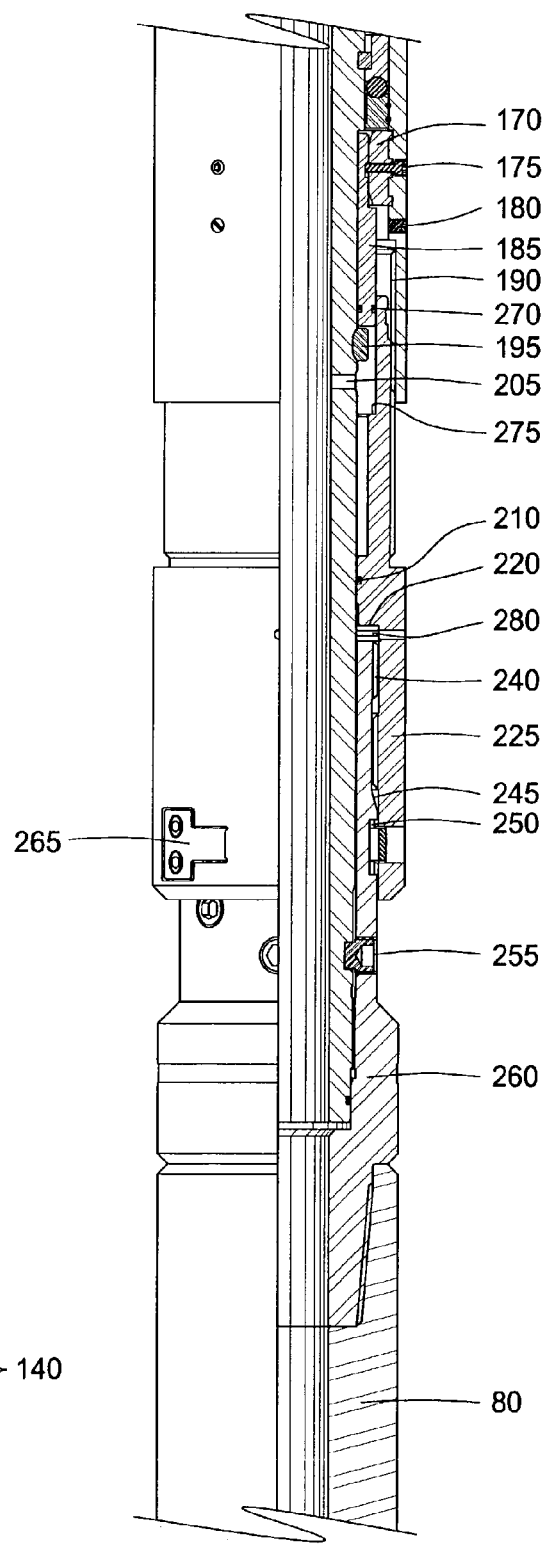

FIGS. 4A and 4B are a cross-sectional view illustrating the hydraulically activated swivel 100 in compression. The swivel 100 may need to compress during the expansion operation of the liner to permit the running tool 80 to operate properly. This present invention includes a function that allows the swivel 100 to compress a predetermined distance, thereby protecting components in the running tool 80 from impact loading during operation. In other words, the lower mandrel 135 and the bottom connection 260 move axially upward closing off the gap 134, thereby compressing the biasing members 130 between the lower mandrel 135 and the upper mandrel 110. In this manner, the swivel 100 permits the running tool 80 to function properly.

In operation, the liner (not shown), expander tool 90, swivel 100 and the running tool 80 are run-in the wellbore on a drill string (not shown). The swivel 100 is in the run-in position as illustrated in FIGS. 1A and 1B. If any obstruction is encountered during the run-in operation, the liner is "drilled" into the wellbore by applying a rotational force from the drill string to the liner through the expander tool 90, swivel 100 and running tool 80. In this respect, the swivel 100 acts as a complete unit as discussed in FIGS. 1A and 1B.

The liner is run-in to a predetermined point near the end of an existing casing string (not shown). Subsequently, fluid is pumped from the surface of the wellbore down the drill string through the expander tool 90 and the upper and lower mandrel passageways 112, 132 to the running tool 80. Thereafter, a hydraulic isolation device (not shown) is circulated down into a seat (not shown) below the running tool 80. The fluid pressure builds up in the running tool 80 and the lower mandrel passageway 132 until the fluid level reaches aperture 205. As pressurized fluid enters aperture 205, a hydraulic force is created acting against the first sleeve shoulder 275 on the sleeve 225. At a predetermined hydraulic force, the shearable connection 180 fails and the sleeve 225 is urged axially downward toward the second position, thereby contacting the plurality of washers 280 disposed on the bottom connection 260.

The movement of the sleeve 225 from the first to the second position disengages spline assembly 240, thereby removing the mechanical connection between the sleeve 225 and the bottom connection 260. Thereafter, the upper portion that includes connection 105, upper mandrel 110, housing 125, and sleeve 225 is rotationally separate from the lower portion that includes mandrel 135 and connection 260. In other words, the swivel 100 is capable of exclusively rotating the upper portion in a first direction while allowing the bottom portion to remain stationary. Subsequently, the expander tool 90 is activated and the expansion operation begins. A rotational force by the drill string in the first direction causes the expander tool 90 and the upper portion of the swivel 100 to rotate while the lower portion and the running tool 80 remain stationary. During the expansion operation, the load members 140 carry the entire weight of the liner and permit a rotational connection between the housing 125 and the lower mandrel 135.

Additionally, the movement of the sleeve 225 to the second position aligns the spring clip 265 on the sleeve 225 with the relief groove 250 formed on an outer portion of the bottom connection 260. The spring clip 265 is constructed and arranged to mate and act upon the relief groove 250 when the upper portion of the swivel 100 rotates in the second direction but not in the first direction. In this manner, the spring clip 265 and the relief groove 250 act as a clutch system allowing the rotation of the upper and lower portion as a rotationally locked unit in the second direction while permitting the upper portion to rotate free of the lower portion in the first direction.

After the expansion operation is complete, the running tool 80 is deactivated, thereby allowing the liner to hang exclusively from the casing string. The running tool 80 is released from the liner through hydraulic means. In the event of a hydraulic failure, the running tool 80 may be released by mechanical means by rotating the swivel 100 in the second direction. In this respect, a rotational force from the drill string is transmitted in the second direction through the expander tool 90 to the top connection 105 of the swivel 100. The top connection 105 transmits the rotational force through the upper torque pin 115 to the upper mandrel 110. The upper mandrel 110 transmits the rotational force through the upper spline assembly 120 to the housing 125. The housing 125 transmits the rotational force through the middle spline assembly 190 to the sleeve 225. The sleeve 225 transmits the rotational force to the bottom connection 260 by allowing the spring clip 265 to contact and act against the clip groove 250, thereby causing the bottom connection 260 to rotate in the second direction. The bottom connection 260 transmits the rotational force in the second direction to the running tool 80, thereby releasing the running tool from the liner.

While the foregoing is directed to embodiments of the present invention, other and further embodiments of the invention may be devised without departing from the basic scope thereof, and the scope thereof is determined by the claims that follow.

What is claimed is:

1. An apparatus for use in a wellbore, comprising:
a top body;
a bottom body; and
a sleeve mechanically connected to the top and bottom bodies, the sleeve movable between a first position to a second position, whereby in the first position, the top and bottom bodies rotate as one unit and in the second position, the top body rotates independent of the bottom body in a first direction and with the bottom body in a second direction.

2. The apparatus of claim 1, wherein the top body includes a connection means to attach to an expander tool and the bottom body includes a connection means to attach to a running tool.

3. The apparatus of claim 1, further including a first mechanical connection assembly disposed between the top body and the sleeve.

4. The apparatus of claim 3, further including a second mechanical connection assembly disposed between the sleeve and the bottom body.

5. The apparatus of claim 4, wherein each mechanical connection assembly comprises of a spline assembly.

6. The apparatus of claim 4, wherein the second mechanical connection assembly disengages when the sleeve moves to the second position.

7. The apparatus of claim 1, further including a housing at least partially disposed around the bottom body, wherein a load member is disposed between the housing and the bottom body.

8. The apparatus of claim 7, further including a shearable connection between the housing and the sleeve, whereby at a predetermined pressure, the shearable connection fails, thereby allowing the sleeve to move to the second position.

9. The apparatus of claim 1, wherein the bottom body is an annular member that includes at least one aperture.

10. The apparatus of claim 9, wherein an upper shoulder is formed in the sleeve and the upper shoulder is aligned with the aperture.

11. The apparatus of claim 1, further including at least one spring clip disposed on an exterior surface of the sleeve.

12. The apparatus of claim 11, further including at least one clip groove formed on an exterior surface of the bottom body.

13. The apparatus of claim 12, wherein the sleeve in the second position aligns the at least one spring clip with the at least one clip groove, thereby allowing the top and bottom body to rotate together in the second direction.

14. The apparatus of claim 1, further including at least one biasing member disposed between the top and bottom body to create a gap between the top and bottom body.

15. The apparatus of claim 1, further including a load member, wherein the load member comprises of a plurality of thrust bearings.

16. A hydraulically activated swivel for use in a well, comprising:
an upper tubular;
a lower tubular connected to a bottom connection;
a sleeve member connected to the upper tubular, the sleeve member movable between a first location to a second location, whereby in the first location a lower spline assembly is fully engaged thereby permitting the upper and lower tubulars to rotate as one unit and in the second location the lower spline assembly is disengaged thereby allowing the upper tubular to rotate independent of the lower tubular in a first direction and with the lower tubular in a second direction.

17. The hydraulically actuated swivel of claim 16, further includes a load member, wherein the load member is constructed and arranged to carry the weight of a liner while allowing the upper and lower tubular to rotate.

18. The hydraulically actuated swivel of claim 17, wherein the load member comprises of a plurality of thrust bearings.

19. The hydraulically actuated swivel of claim 16, whereby the sleeve member is connected to the upper tubular by an upper spline assembly.

20. The hydraulically actuated swivel of claim 16, further including at least one biasing member disposed between the upper and lower tubular to create a gap between the upper and lower tubular.

21. The hydraulically actuated swivel of claim 16, wherein the lower tubular includes at least one aperture.

22. The hydraulically actuated swivel of claim 21, wherein an upper shoulder is formed in the sleeve member and the upper shoulder is aligned with the at least one aperture in the lower tubular.

23. The hydraulically actuated swivel of claim 16, further including at least one spring clip disposed on an outer portion of the sleeve member.

24. The hydraulically actuated swivel of claim 23, further including at least one clip groove formed on an outer portion of the bottom connection, wherein the sleeve member in the second location aligns the at least one spring clip with the at least one clip groove.

25. The hydraulically actuated swivel of claim 16, further including a plurality of washers disposed on an upper portion of the bottom connection, whereby the sleeve member in the second location contacts the plurality of washers.

26. The hydraulically actuated swivel of claim 16, further including a shearable connection between the housing and the sleeve member, whereby at a predetermined pressure the shearable connection fails allowing the sleeve member to move to the second location.

27. A method of completing a wellbore, comprising:
running an assembly and a liner disposed on a drill string into the wellbore, the assembly including:
an expander tool;
a hydraulically actuated swivel having a lower portion, an upper portion, a sleeve, and a load member, whereby the lower and upper portions are initially rotationally locked; and
a running tool mechanically connected to the liner;
rotating the assembly and the liner as one rotationally locked unit;
placing the assembly and liner at a predetermined location near the end of an existing casing in the wellbore;
activating the hydraulically activated swivel by dropping a hydraulic isolation device from the surface of the wellbore into the swivel and causing the sleeve to move from a first position to a second position, thereby allowing the upper portion of the swivel to rotate independently of the lower portion in a first direction and with the lower portion in a second direction;
activating the expander tool;
expanding the liner into the existing casing;
deactivating the expander; and
removing the drill string and running assembly from the wellbore.

28. The method of claim 27, further including the step of supporting the entire load of the liner by the load member.

29. The method of claim 28, wherein the load member comprises of at least one thrust bearing.

30. An apparatus for use in a wellbore, comprising:
a top body disposable in a tubular string;
a lower body disposed adjacent the top body; and
a hydraulically shiftable member that selectively permits the bodies to rotate together while the member is in a first position and to rotate freely with respect to each other in one direction and rotate together in a second direction while the member is in a second position.

31. A method for operating a hydraulic swivel, comprising:
disposing the hydraulic swivel in a wellbore, the hydraulic swivel including:
an upper body;
a lower body; and
a sleeve mechanically connected to the upper and lower bodies, whereby the upper and lower bodies are initially rotationally locked;
rotating the hydraulic swivel as one unit;
activating the hydraulic swivel by dropping a hydraulic isolation device from the surface of the wellbore;
pumping fluid into the hydraulic swivel, thereby causing the sleeve to move from a first position to a second position;
rotating the upper body independent of the lower body in a first direction; and
rotating the upper and lower bodies together in a second direction.

32. A method of completing a wellbore, comprising:
running an assembly and a liner disposed on a drill string into the wellbore, the assembly including:
an expander tool;
a hydraulically actuated swivel having a lower portion, an upper portion, a sleeve, and a load member, whereby the lower and upper portions are initially rotationally locked; and
a running tool mechanically connected to the liner;
rotating the assembly and the liner as one rotationally locked unit;
placing the assembly and liner at a predetermined location near the end of an existing casing in the wellbore;
activating the hydraulically activated swivel by dropping a hydraulic isolation device from the surface of the wellbore and causing the sleeve to move from a first position to a second position, thereby allowing the portions to rotate freely with respect to each other in a first direction and together as a unit in a second direction;
activating the expander tool;
expanding the liner into the existing casing;
deactivating the expander;
deactivating the running tool by rotating the hydraulically activated swivel in the second direction; and
removing the drill string and running assembly from the wellbore.

33. The method of claim 32, whereby rotating the hydraulically activated swivel in the second direction causes a spring clip on the upper portion to act against a groove on the lower portion, thereby allowing the upper portion and the lower portion to move in the same direction.

34. An apparatus for use in a wellbore, comprising:
a top body; and
a lower body operatively attached to the top body by a multi-position sleeve, whereby the sleeve in a first axial position allows the bodies to rotate together as a unit and the sleeve in a second axial position allows the top body to rotate independently of the bottom body in a first direction and together as a unit in a second direction.

35. An apparatus for use in a wellbore, comprising:
a top body; and
a bottom body operatively connected to the top body by a multi-position sleeve, whereby the sleeve permits the bodies to rotate together as a unit while the sleeve is in one axial position and to rotate freely with respect to each other in one direction and together as a unit in a second direction while the sleeve is in another axial position.

36. A method for operating a hydraulic swivel, comprising:
disposing the hydraulic swivel in a wellbore, the hydraulic swivel having an upper body, a lower body and a sleeve mechanically connected to the upper and lower bodies;
rotating the hydraulic swivel as one unit;
activating the hydraulic swivel thereby causing the sleeve to move from a first position to a second position;
rotating the upper body independent of the lower body in a first direction; and
rotating the upper and lower bodies together in a second direction.

* * * * *